United States Patent
Chiang

[19]

[11] Patent Number: 6,135,177
[45] Date of Patent: Oct. 24, 2000

[54] WOOD PLANING MACHINE

[76] Inventor: Pei-Lieh Chiang, No. 12, Nan-Ping Rd., Nan Dist., Taichung City, Taiwan

[21] Appl. No.: 09/439,579

[22] Filed: Nov. 12, 1999

[51] Int. Cl.[7] ........................................................ B27C 1/00
[52] U.S. Cl. ......................................... 144/129; 144/117.1
[58] Field of Search ................................. 144/114.1, 116, 144/117.1, 129, 130

[56] References Cited

U.S. PATENT DOCUMENTS

| | | | |
|---|---|---|---|
| 2,804,107 | 8/1957 | Taylor | 144/129 |
| 3,067,788 | 12/1962 | Eschenburg | 144/129 |
| 3,718,168 | 2/1973 | Berends | 144/129 |
| 4,456,042 | 6/1984 | Clark | 144/129 |

FOREIGN PATENT DOCUMENTS

| | | | |
|---|---|---|---|
| 220686 | 4/1910 | Germany | 144/129 |
| 411623 | 4/1945 | Italy | 144/129 |
| 25351 | of 1901 | United Kingdom | 144/129 |

*Primary Examiner*—W. Donald Bray
*Attorney, Agent, or Firm*—Christie, Parker & Hale, LLP

[57] ABSTRACT

A wood planing machine includes a machine housing with two upright side walls, and a cutter unit mounted between the side walls to extend in a transverse direction. A workpiece support bed is movably disposed in the machine housing between the side walls and below the cutter unit. The bed is movable uprightly relative to the cutter unit so as to define a workpiece passage therebetween. A holding seat is suspended in the machine housing below the bed and between the side walls. The holding seat includes a tubular body formed with an upright passage therethrough, and a radial pinion-mounting hole in communication with the passage. A height adjustment mechanism includes an upright coupling member secured to a bottom side of the bed, and a vertical rack that extends between upper and lower ends of the coupling member. The coupling member extends slidably through the passage of the holding seat. A drive shaft has a first coupling end mounted rotatably on the tubular body and extending across the pinion-mounting hole. A turning wheel unit is mounted on the machine housing and is coupled to a second coupling end of the drive shaft. A pinion is disposed in the pinion-mounting hole and is fixed on the first coupling end of the drive shaft for meshing with the vertical rack.

8 Claims, 12 Drawing Sheets

WOOD PLANING MACHINE

BACKGROUND OF THE INVENTION

1. Field of the Invention

The present invention relates to a wood planing machine, more particularly to a wood planing machine with a height adjustment mechanism that is adapted to be operated externally of a machine body with ease.

2. Description of the Related Art

Figure 1:
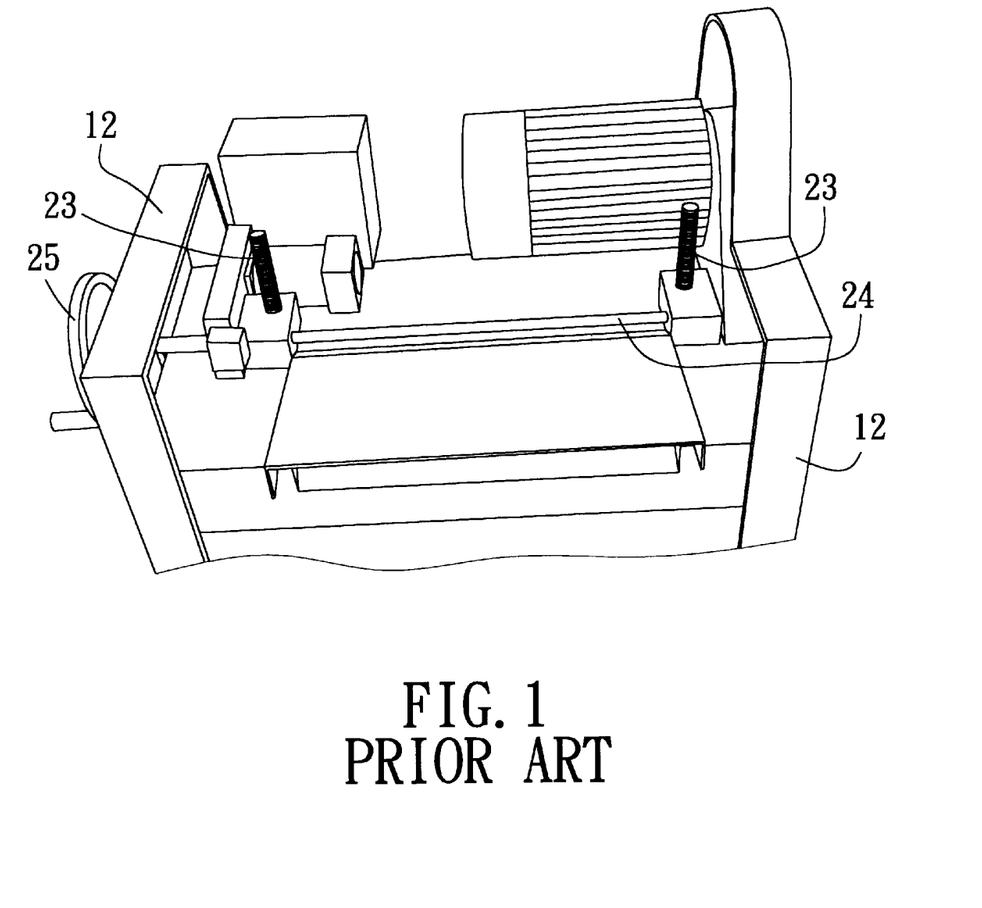
FIG. 1 is a fragmentary perspective view of a conventional wood planing machine.
Figure 2:
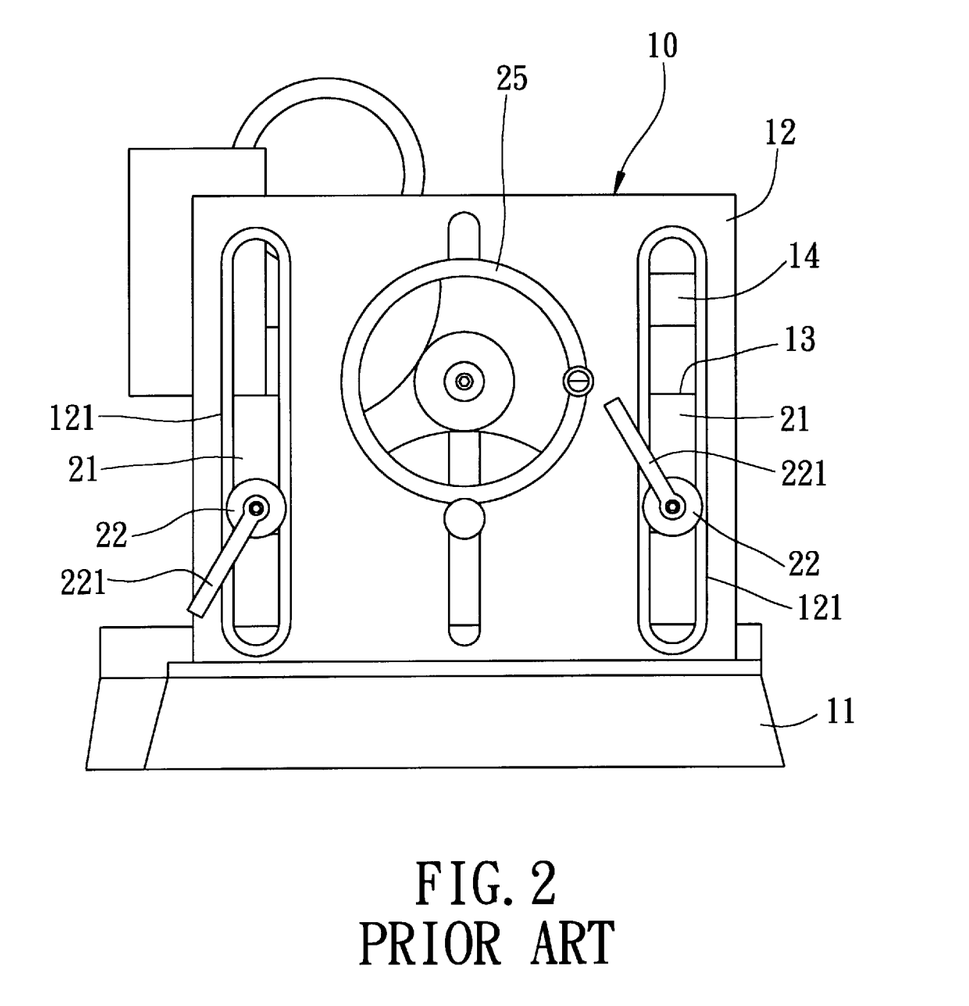
FIG. 2 is a side view of the conventional wood planing machine.

Referring to FIGS. 1 and 2, a conventional wood planing machine 10 is shown to include a machine base 11, an upper housing 13, and cutting and feed rollers 14.

As illustrated, the machine base 11 has a bed with opposite end portions, a pair of upright threaded rods 23 mounted rotatably on the opposite end portions of the bed, and a pair of vertical side walls 12 mounted on the opposite end portions of the bed. The side walls 12 are formed with front and rear pairs of aligned vertically extending slots 121.

The upper housing 13 is disposed between the side walls 12 above the bed. The upper housing 13 has front and rear portions provided respectively with an opposite pair of insert pieces 21 which engage a corresponding one of the front and rear pairs of vertically extending slots 121 to mount slidably the upper housing 13 on the side walls 12. The upper housing 13 further has opposite end portions formed with a pair of vertically extending screw holes. The threaded rods 23 extend threadedly and respectively through the screw holes, and are rotatable on the bed so as to raise or lower the upper housing 13 to a desired position relative to the bed.

The cutter and feed rollers 14 are mounted rotatably on the upper housing 13, and are rotatable about parallel horizontal axes.

The front and rear sides of the housing 13 are formed with vertical bores for extension of front and rear pairs of upright pillars (not visible) mounted on the machine bed.

The front and rear insert pieces 21 are formed with a respective horizontal bore therethrough which receives a respective horizontal mounting shaft that is aligned with a corresponding one of the front and rear pairs of vertically extending slots 121. The mounting shaft has opposite first and second end portions which extend respectively into the corresponding one of the slots 121 and which has a respective clamp piece 22 provided thereon.

The clamp pieces 22 are provided with externally operable locking knobs 221 respectively for forcing the clamp pieces 22 against the side walls 12 to lock the upper housing 13 at the desired position on the side walls 12.

The drawbacks of the aforementioned wood planing machine 10 are as follows:

1. The upper housing 13 can be positioned at a desired height on the machine base 11 due to the threaded engagement thereof with the threaded rods 23. When the wood planing machine 10 is in operation, the upper housing 13 is subjected to vertical forces which are applied to the threaded engagement between the threaded rods 23 and the upper housing 13, thereby resulting in the possibility of damage to the screw threads on the threaded rods 23 or in the screw holes.

2. The vertical bores in the upper housing 13 must match the pillars on the bed so as to ensure smooth sliding movement of the upper housing 13 on the pillars. However, when the wood planing machine 10 is in operation, the upper housing 13 may be subjected to uneven lateral forces which are transmitted to the pillars. As such, bending of the pillars may result to prevent future adjustment of the height of the upper housing 13.

Figure 3:
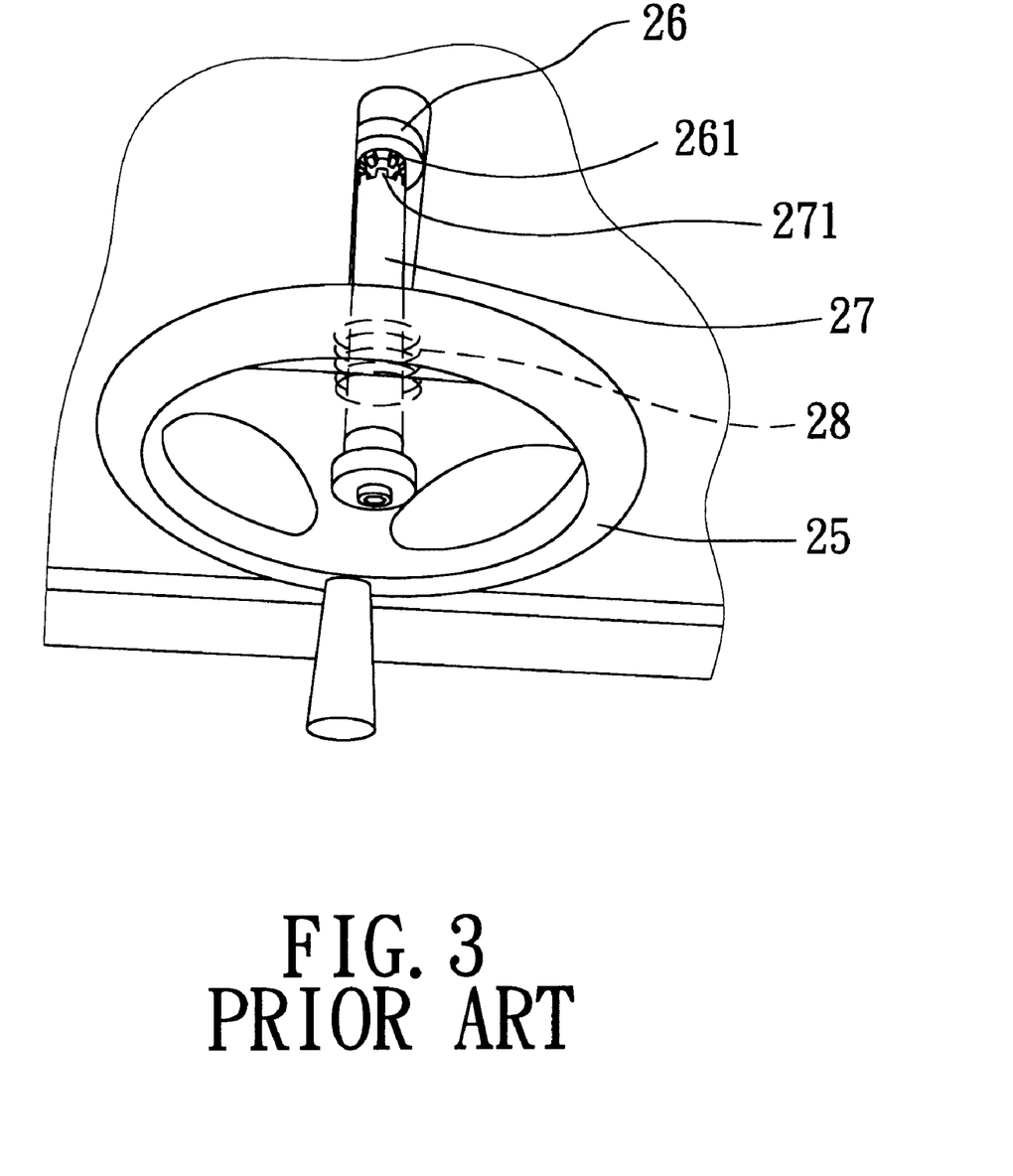
FIG. 3 illustrates how a turning wheel unit is actuated in order to adjust the height of an upper housing relative to a machine base in the conventional wood planing machine.
Figure 4:
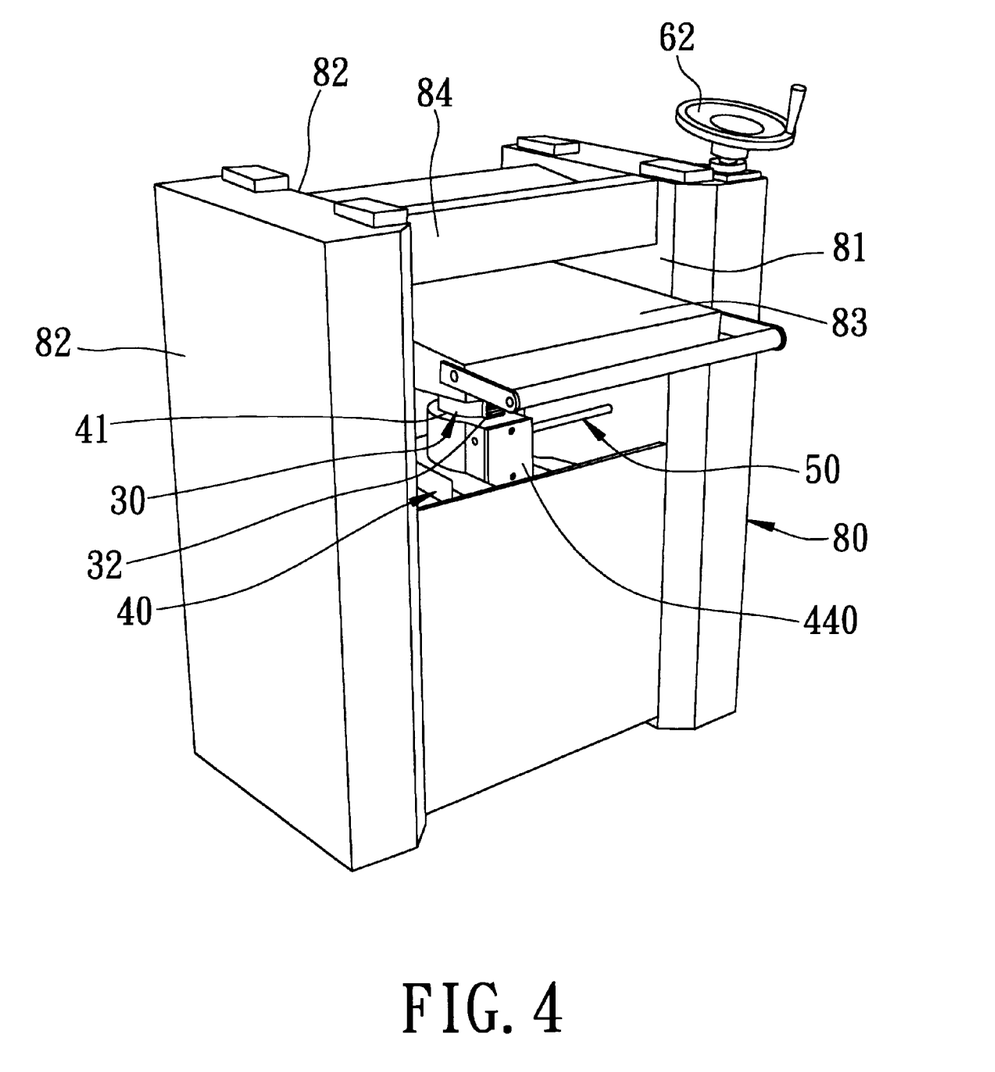
FIG. 4 shows a perspective view of a preferred embodiment of a wood planing machine of the present invention.
Figure 5:
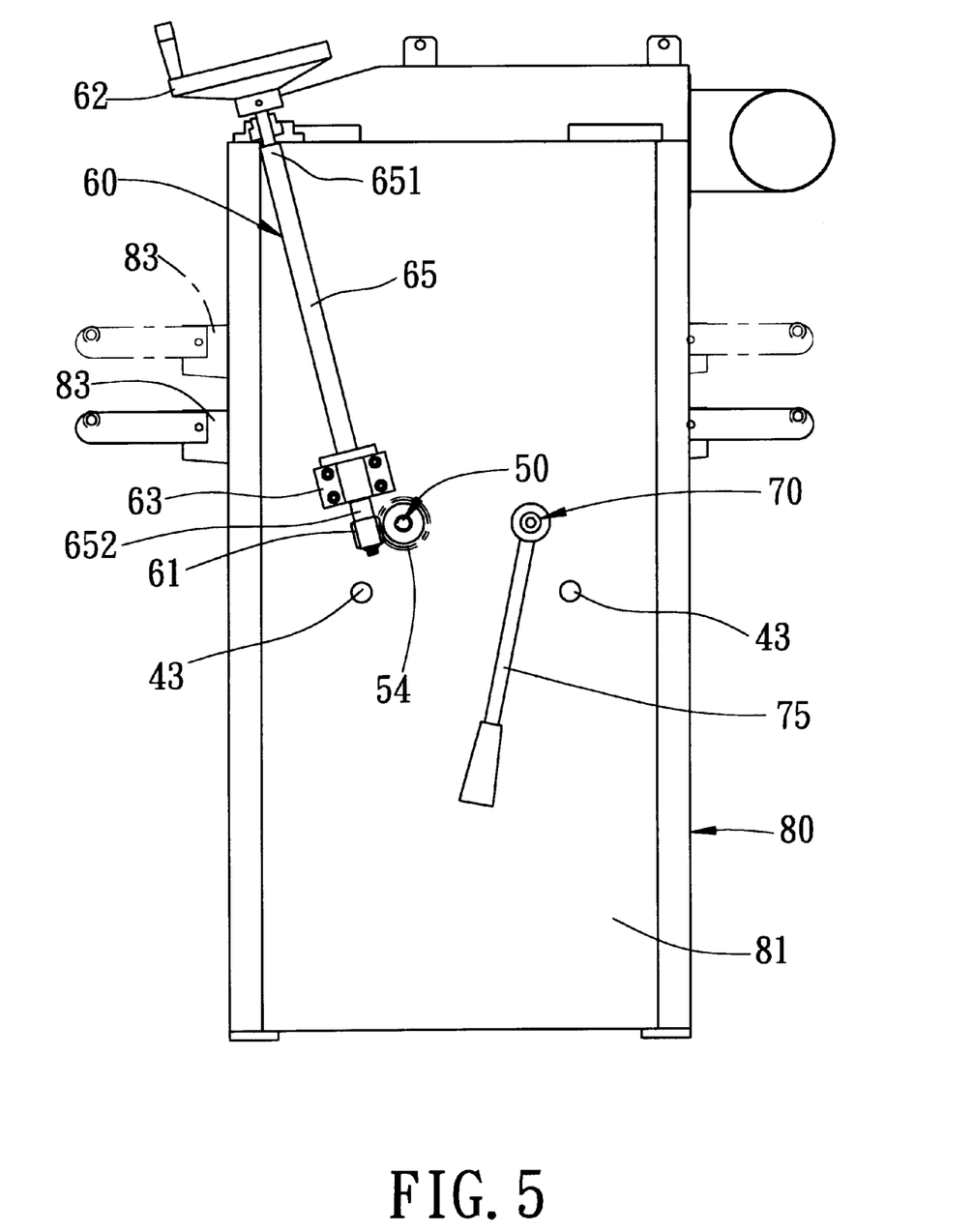
FIG. 5 is a side view of the preferred embodiment.
Figure 6:
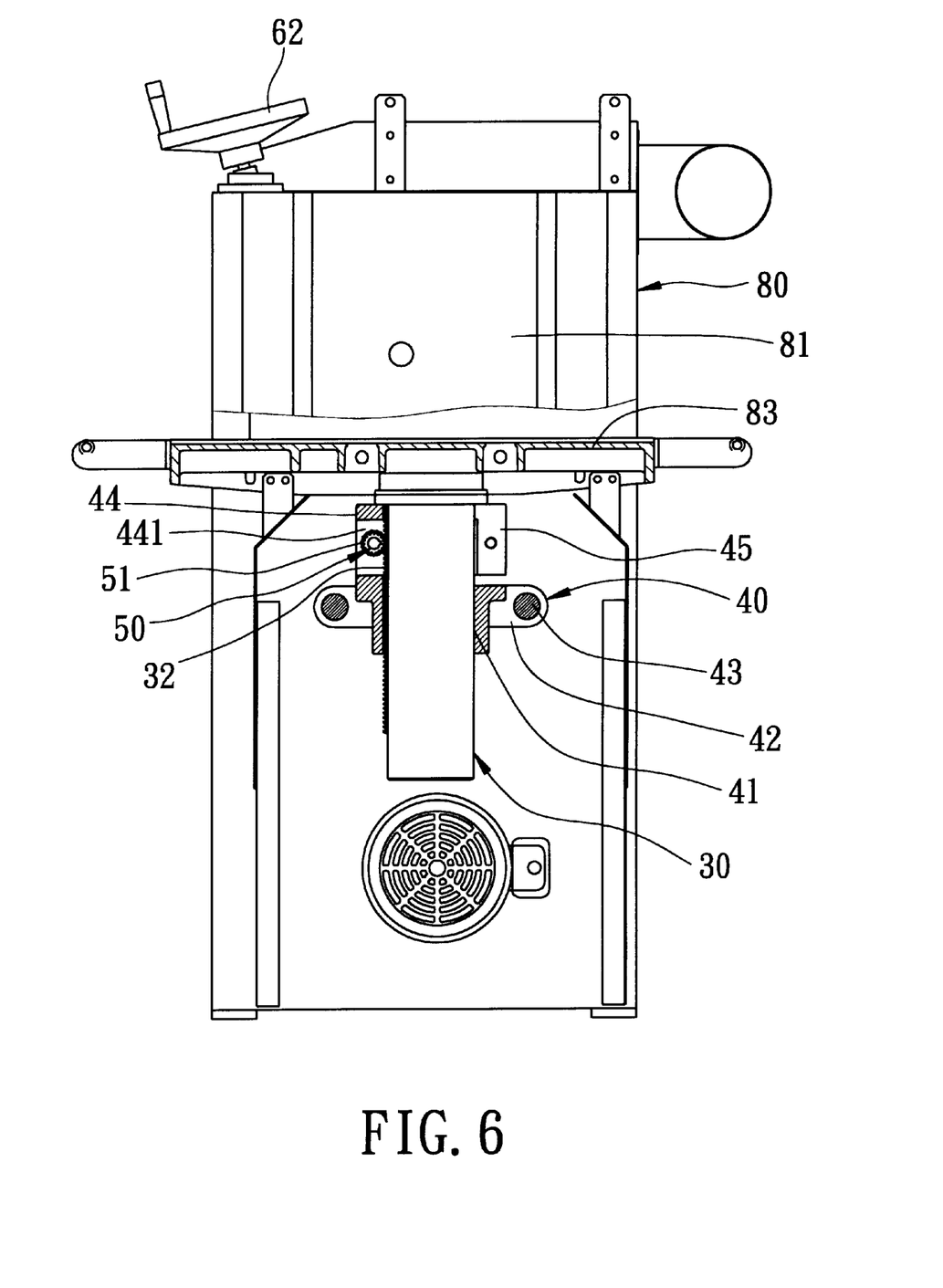
FIG. 6 is a fragmentary sectional side view of the preferred embodiment.

3. Referring to FIG. 3, the conventional wood planing machine 10 further includes a rotating shaft 24 disposed between the side walls 12 and operably connected to the threaded rods 23, and a transmission shaft 26 with a transmission gear 261 mounted co-axially on the rotating shaft 24. A turning wheel unit is provided on one of the side walls 12, and includes a turning wheel 25, and a wheel axle 27 having a proximate end secured to the turning wheel 25 and a distal teethed end 271. When adjusting the height of the upper housing 13 relative to the bed, the turning wheel 25 is pressed against biasing action of a spring 28 so as to mesh the teethed end 271 of the wheel axle 27 with the transmission gear 261. This action inconveniences the user of the conventional wood planing machine.

SUMMARY OF THE INVENTION

Therefore, the object of this invention is to provide a wood planing machine which is clear of the aforementioned drawbacks that are associated with the use of the conventional wood planing machine.

Accordingly, a wood planing machine of the present invention includes a machine housing, a cutter unit, a workpiece support bed, a holding seat, and a height adjustment mechanism. The machine housing has upright left and right side walls that are spaced apart from each other in a transverse direction. The cutter unit is mounted to the machine housing, and extends in the transverse direction between the left and right side walls. The workpiece support bed is movably disposed in the machine housing between the left and right side walls and below the cutter unit. The workpiece support bed has top and bottom sides and is movable uprightly relative to the cutter unit so as to define a workpiece passage between the top side of the bed and the cutter unit. The holding seat is suspended in the machine housing below the workpiece support bed and between the left and right side walls. The holding seat includes a tubular body formed with an upright passage therethrough. The tubular body is further formed with a radial pinion-mounting hole in communication with the passage. The height adjustment mechanism includes an upright coupling member having an upper end secured to the bottom side of the workpiece support bed, a lower end, and a vertical rack that extends between the upper and lower ends. The coupling member extends slidably through the passage of the holding seat with the vertical rack registering with the pinion-mounting hole. A drive shaft has a first coupling end that is mounted rotatably on the tubular body and that extends across the pinion-mounting hole in the transverse direction, and a second coupling end. A turning wheel unit is mounted on the machine housing and is coupled to the second coupling end of the drive shaft for driving the drive shaft to rotate axially. A pinion is disposed in the pinion-mounting hole, and is mounted on the first coupling end of the drive shaft for co-rotation therewith. The pinion meshes with the vertical rack to move the workpiece support bed relative to the cutter unit when the drive shaft rotates axially.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Referring to FIGS. 4, 5, 6 and 7, the preferred embodiment of a wood planing machine of the present invention is shown to include a machine housing 80, a cutter unit 84, a workpiece support bed 83, a holding seat 40, and a height adjustment mechanism 60.

As illustrated, the machine housing 80 has upright left and right side walls 81,82 that are spaced apart from each other in a transverse direction.

The cutter unit 84 is mounted on the machine housing 80 in a conventional manner, and extends in the transverse direction between the left and right side walls 81,82.

The workpiece support bed 83 is movably disposed in the machine housing 80 between the left and right side walls 81,82 and below the cutter unit 84. The support bed 83 has top and bottom sides, and is movable uprightly relative to the cutter unit 84 so as to define a workpiece passage between the top side of the support bed 83 and the cutter unit 84.

The holding seat 40 is suspended in the machine housing 80 below the support bed 83 and between the left and right side walls 81,82. The holding seat 40 includes a tubular body 41 formed with an upright passage 410 therethrough, and a rectangular radial projection 44 integrally formed with the tubular body 41 and which defines a radial pinion-mounting hole 441 in communication with the upright passage 410. A cover member 440 is detachably mounted on the radial projection 44 to shield the pinion-mounting hole 441.

The height adjustment mechanism 60 includes an upright coupling member 30, a drive shaft 50, a turning wheel unit, and a pinion 51. The coupling member 30 is in a form of a tube, and has an upper end 301 secured to the bottom side of the bed 83, a lower end 302, and a vertical rack 32 that extends between the upper and lower ends 301,302. The coupling member 30 extends slidably through the passage 410 of the tubular body 41 with the vertical rack 32 registering with the pinion-mounting hole 441. The drive shaft 50 has a first coupling end 503 that is mounted rotatably on the tubular body 41 and that extends across the pinion-mounting hole 441 in the transverse direction, and a second coupling end 502. The turning wheel unit is mounted on the machine housing 80, and is coupled to the second coupling end 502 of the drive shaft 50 for driving the drive shaft 50 to rotate axially. The pinion 51 is disposed in the pinion-mounting hole 441 of the radial projection 44. A fastener screw 52 extends through the pinion 51 and is mounted on the first coupling end 503 of the drive shaft 50 to ensure co-rotation of the pinion 51 with the drive shaft 50. The pinion 51 meshes with the vertical rack 32 to move the support bed 83 relative to the cutter unit 84 when the drive shaft 50 rotates axially.

Figure 7:
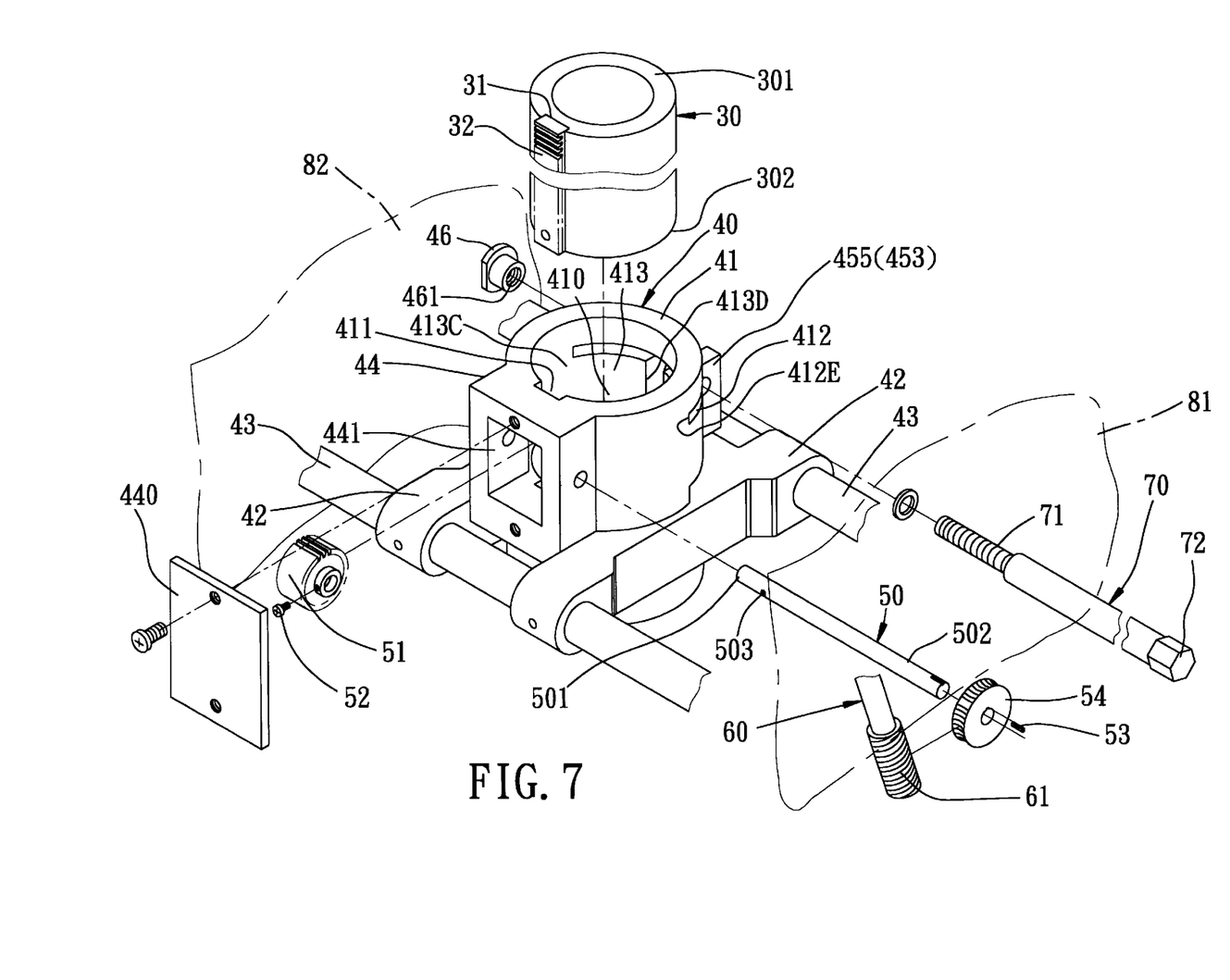
FIG. 7 is an exploded perspective view of a height adjustment mechanism employed in the preferred embodiment.
Figure 8:
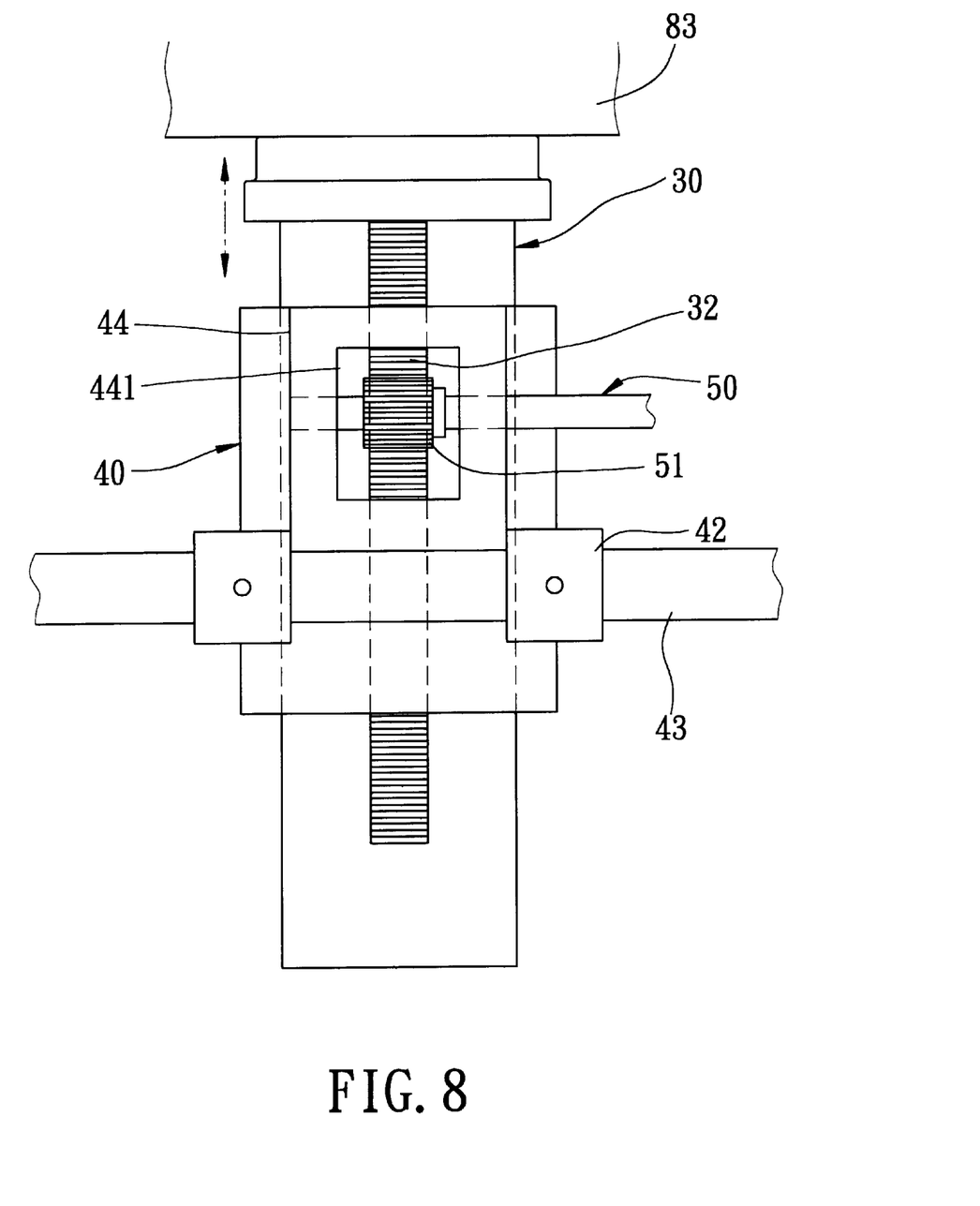
FIG. 8 is a fragmentary schematic view of the preferred embodiment, illustrating how the height of a workpiece support bed is adjusted.

In the preferred embodiment, the tubular body 41 has a pair of connecting portions 42 on opposite sides of the pinion-mounting hole 441. The holding seat 40 further includes a pair of bracing rods 43 that extend through the connecting portions 42 of the tubular body 41 and that have opposite ends secured to the left and right side walls 81,82, respectively. Preferably, the second coupling end 502 of the drive shaft 50 has a worm gear 54 secured thereon by means of a key 53. The turning wheel unit includes a transmission shaft 65, and a mounting member 63 fixed on the left side wall 81 for mounting the transmission shaft 65 such that the transmission shaft 65 on the left side wall 81 is rotatable axially. The transmission shaft 65 has a first end 651 provided with a turning wheel 62, and a second end 652 provided with a worm 61 that meshes with the worm gear 54.

The coupling member 30 has an outer wall surface formed with a vertically extending mounting groove 31. The vertical rack 32 is mounted securely to the coupling member 30 in the mounting groove 31 and projects radially from the outer wall surface of the coupling member 30. The tubular body 41 has an inner wall surface formed with a vertically extending slide groove 411. The vertical rack 32 extends slidably into the slide groove 411, thereby guiding movement of the coupling member 30 relative to the holding seat 40.

The preferred embodiment further includes a locking mechanism provided on the tubular body 41 opposite to the radial projection 44 and operable to result in tight frictional engagement between the tubular body 41 and the coupling member 30 for retaining the support bed 83 at a desired position relative to the cutter unit 84. The tubular body 41 is further formed with a radial opening 412 in communication with the passage 410, and has opposite edges 412E. The locking mechanism includes a pair of clamping plates 413, a parallel pair of lug plates 45, and a locking shaft 70. Each of the clamping plates 413 has a connecting end 413C that is connected to a respective one of the opposite edges 412E of the radial opening 412, and a distal end 413D that forms a clearance 451 (see FIG. 9) with the distal end 413D of the other one of the clamping plates 413. Each of the lug plates 455,453 extends from the distal end 413D of a respective one of the clamping plates 413 away from the tubular body 41. One of the lug plates 455 is formed with a through-hole. The other one of the lug plates 453 is provided with a nut 46 that is formed with an internally threaded screw hole 461.

Figure 9:
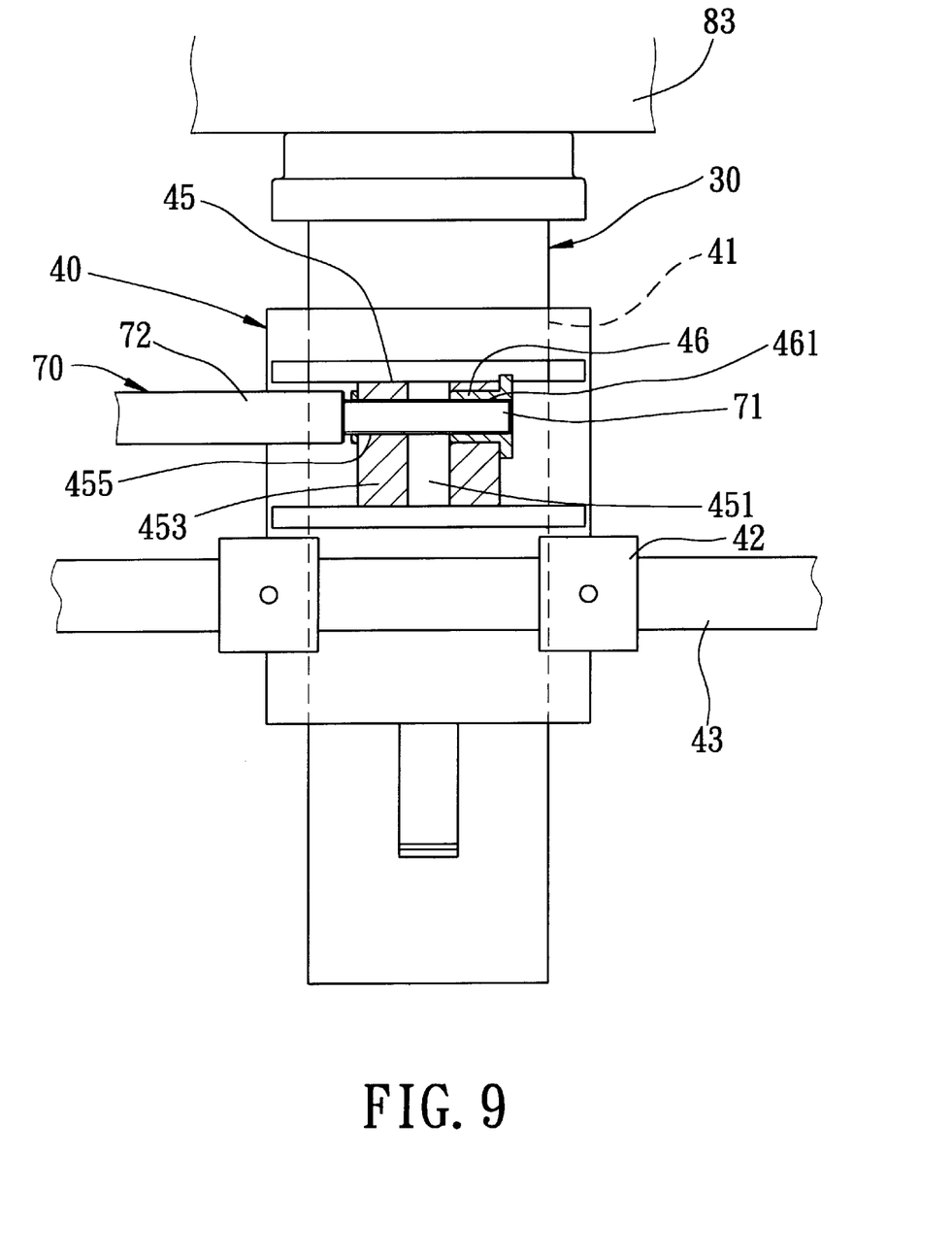
FIG. 9 illustrates how the workpiece support bed is locked relative to a holding seat suspended on two side walls of the preferred embodiment.
Figure 10:
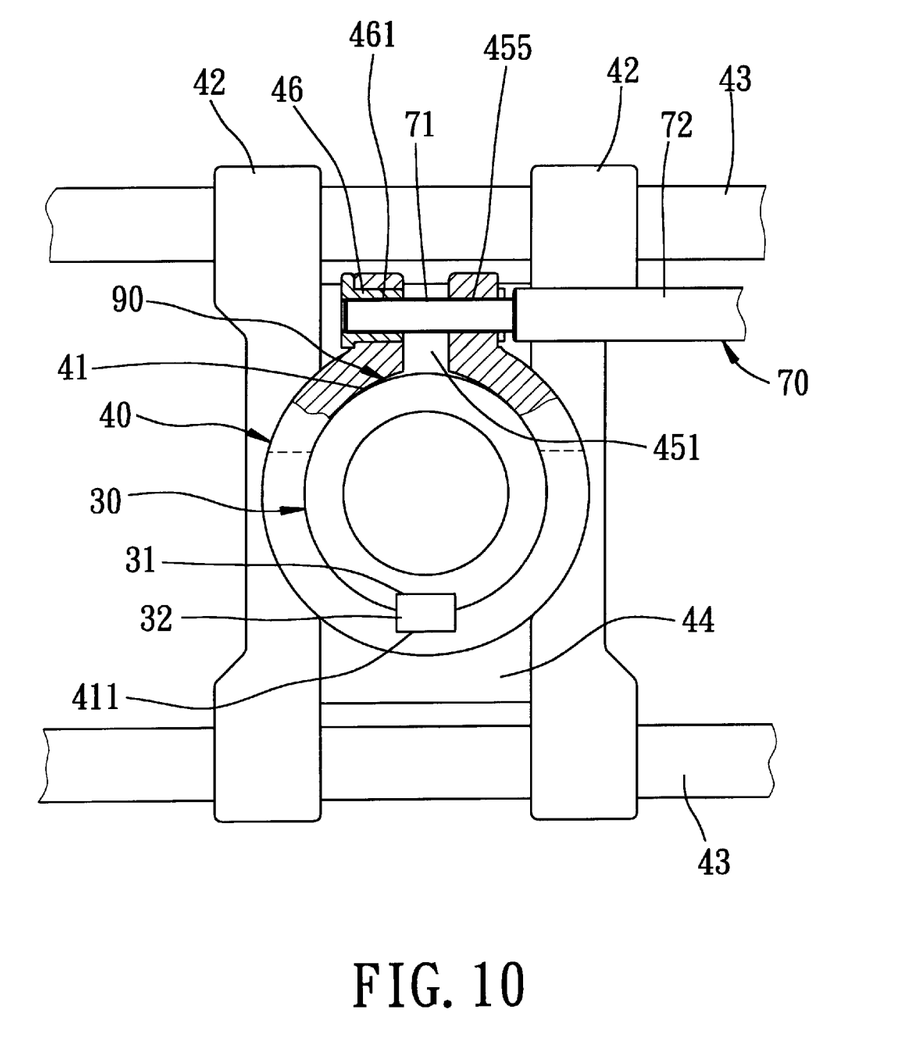
FIG. 10 is a schematic partly sectional view of the preferred embodiment, illustrating the state of the workpiece support bed prior to being locked relative to the holding seat.

As best shown in FIGS. 9 and 10, the locking shaft 70 has a diameter-reduced threaded end portion 71 that extends through the through-hole in the lug plate 455 and that engages the screw hole 461 in the nut 46. The locking shaft 70 is rotatable axially to bring the lug plates 455,453 closer to each other in order to enable the clamping plates 413 to contact tightly the coupling member 30. The locking shaft 70 further has an operating end portion 72 with a polygonal cross-section. The operating end portion 72 of the locking shaft 70 extends rotatably through the left side wall 81 so that the locking shaft 70 is operable externally of the side wall 81.

Figure 11:
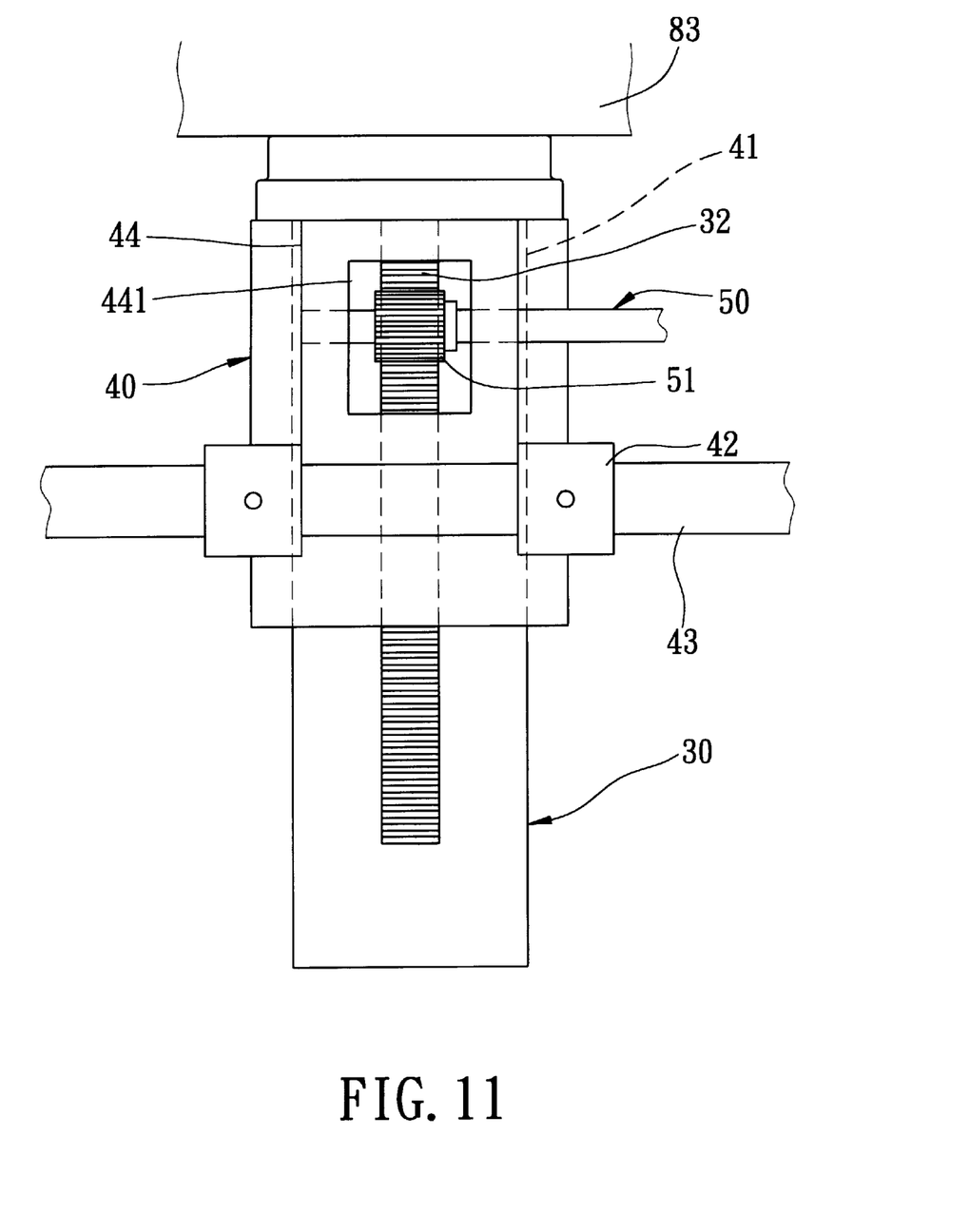
FIG. 11 is another fragmentary schematic view of the preferred embodiment, illustrating how the height of the workpiece support bed is adjusted.

Referring to FIGS. 10 and 11, when it is desired to adjust the height of the workpiece support bed 83 relative the cutting unit 84, the locking shaft 70 is loosened with the use of a tool 75 (see FIG. 5) so as to widen the clearance 451. Under this condition, the workpiece support bed 83 can be lowered or raised relative to the cutting unit 84 via turning of the turning wheel 62, which action consequently rotates the drive shaft 50 to move the coupling member 30 along the upright passage of the tubular body 41.

Figure 12:
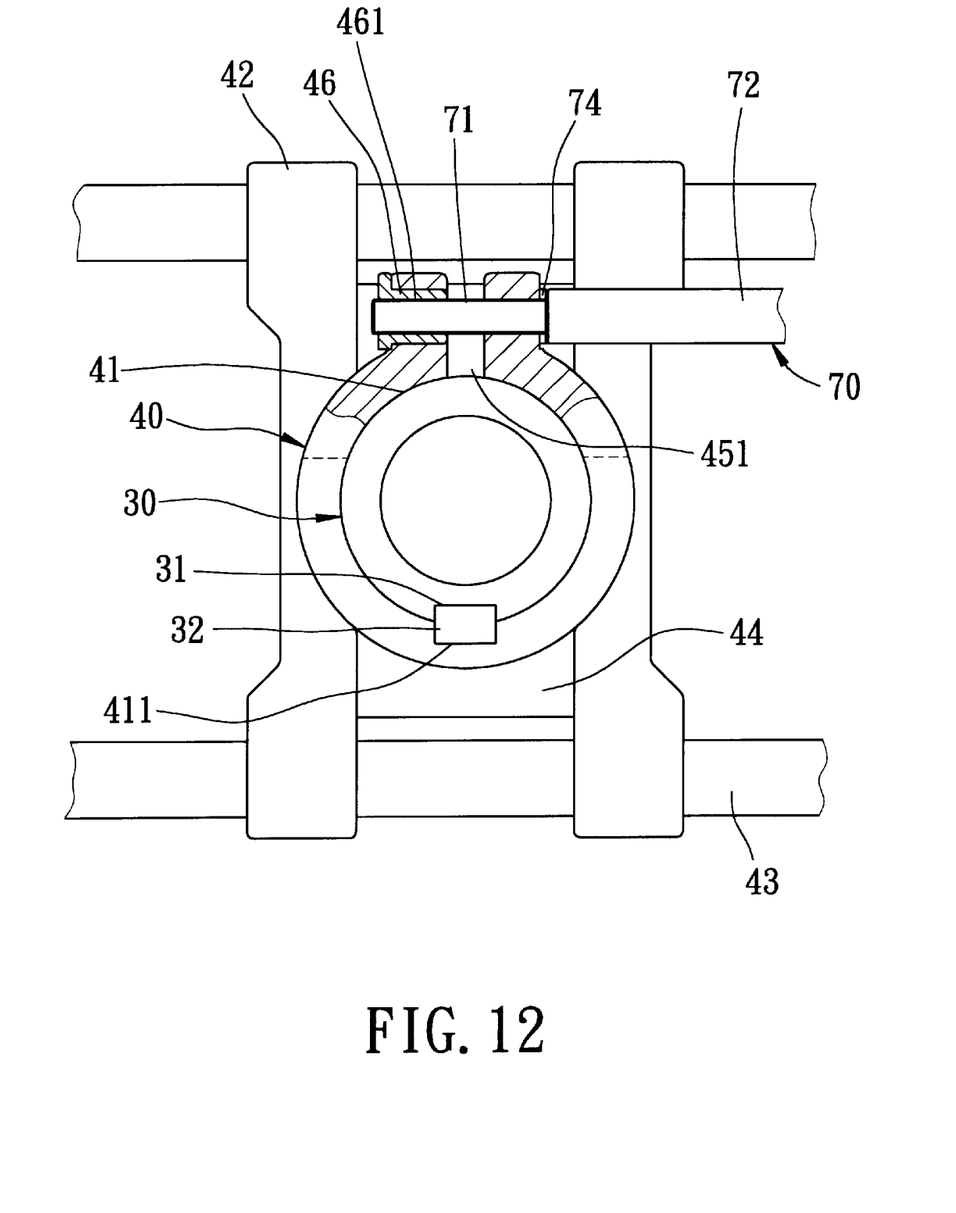
FIG. 12 is another schematic partly sectional view of the preferred embodiment, illustrating the state of the workpiece support bed after being locked relative to the holding seat.

FIG. 12 illustrates a state where the coupling member 30 is locked in the tubular body 41 due to a tightening action on the locking shaft 70.

With this invention thus explained, it is apparent that numerous modifications and variations can be made without departing from the scope and spirit of this invention. It is therefore intended that this invention be limited only as indicated in the appended claims.

I claim:

1. A wood planing machine comprising:
    a machine housing having upright left and right side walls that are spaced apart from each other in a transverse direction;
    a cutter unit mounted to said machine housing and extending in said transverse direction between said left and right side walls;
    a workpiece support bed movably disposed in said machine housing between said left and right side walls and below said cutter unit, said bed having top and bottom sides and being movable uprightly relative to said cutter unit so as to define a workpiece passage between said top side of said bed and said cutter unit;
    a holding seat suspended in said machine housing below said bed and between said left and right side walls, said holding seat including a tubular body formed with an upright passage therethrough, said tubular body being further formed with a radial pinion-mounting hole in communication with said passage; and
    a height adjustment mechanism including
        an upright coupling member having an upper end secured to said bottom side of said bed, a lower end, and a vertical rack that extends between said upper and lower ends, said coupling member extending slidably through said passage of said holding seat with said vertical rack registering with said pinion-mounting hole,
        a drive shaft having a first coupling end that is mounted rotatably on said tubular body and that extends across said pinion-mounting hole in said transverse direction, and a second coupling end,
        a turning wheel unit mounted on said machine housing and coupled to said second coupling end of said drive shaft for driving said drive shaft to rotate axially, and
        a pinion disposed in said pinion-mounting hole and mounted on said first coupling end of said drive shaft for co-rotation therewith, said pinion meshing with said vertical rack to move said bed relative to said cutter unit when said drive shaft rotates axially.

2. The wood planing machine as defined in claim 1, wherein said tubular body has a pair of connecting portions on opposite sides of said pinion-mounting hole, said holding seat further including a pair of bracing rods that extend through said connecting portions and that have opposite ends secured to said left and right side walls, respectively.

3. The wood planing machine as defined in claim 1, wherein said second coupling end of said drive shaft has a worm gear secured thereon, said turning wheel unit including a transmission shaft having a first end provided with a turning wheel, and a second end provided with a worm that meshes with said worm gear.

4. The wood planing machine as defined in claim 3, further comprising a mounting member for mounting said transmission shaft on one of said left and right side walls such that said transmission shaft is rotatable axially.

5. The wood planing machine as defined in claim 1, wherein said coupling member has an outer wall surface formed with a vertically extending mounting groove, said vertical rack being mounted securely to said coupling member in said mounting groove and projecting radially from said outer wall surface of said coupling member, said tubular body having an inner wall surface formed with a vertically extending slide groove, said vertical rack extending slidably into said slide groove.

6. The wood planing machine as defined in claim 1, further comprising a locking mechanism provided on said tubular body and operable to result in tight frictional engagement between said tubular body and said coupling member for retaining said bed at a desired position relative to said cutter unit.

7. The wood planing machine as defined in claim 6, wherein said tubular body is further formed with a radial opening in communication with said passage and having opposite edges, said locking mechanism including
    a pair of clamping plates, each of which has a connecting end that is connected to a respective one of said opposite edges of said radial opening, and a distal end that forms a clearance with said distal end of the other one of said clamping plates,
    a parallel pair of lug plates, each of which extends from said distal end of a respective one of said clamping plates away from said tubular body, one of said lug plates being formed with a through-hole, the other one of said lug plates being provided with a screw hole, and
    a locking shaft having a diameter-reduced threaded end portion that extends through said through-hole and that engages said screw hole, said locking shaft being rotatable axially to bring said lug plates closer to each other in order to enable said clamping plates to contact tightly said coupling member.

8. The wood planing machine as defined in claim 7, wherein said locking shaft further has an operating end portion with a polygonal cross-section, said operating end portion extending rotatably through one of said left and right side walls.

* * * * *